(12) United States Patent
Zhou (10) Patent No.: US 10,264,135 B2
(45) Date of Patent: Apr. 16, 2019

(54) ECHO CANCELLATION METHOD AND APPARATUS, AND COMPUTER STORAGE MEDIUM

(71) Applicant: TENCENT TECHNOLOGY (SHENZHEN) COMPANY LIMITED, Shenzhen (CN)

(72) Inventor: Jiaqing Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/974,337

(22) Filed: May 8, 2018

(65) Prior Publication Data

US 2018/0255183 A1  Sep. 6, 2018

Related U.S. Application Data

(63) Continuation of application No. PCT/CN2016/105370, filed on Nov. 10, 2016.

(30) Foreign Application Priority Data

Feb. 22, 2016 (CN) .......................... 2016 1 0096504

(51) Int. Cl.
*H04M 9/08* (2006.01)
*G10L 21/0232* (2013.01)
*G10L 21/0208* (2013.01)

(52) U.S. Cl.
CPC ......... *H04M 9/082* (2013.01); *G10L 21/0208* (2013.01); *G10L 21/0232* (2013.01);
(Continued)

(58) Field of Classification Search
CPC ..................................................... H04M 9/082
(Continued)

(56) References Cited

U.S. PATENT DOCUMENTS

2002/0041678 A1   4/2002   Basburg-Ertem et al.
2009/0245527 A1  10/2009   Kumar et al.

FOREIGN PATENT DOCUMENTS

CN     1917038 A    2/2007
CN   101719969 A    6/2010
(Continued)

OTHER PUBLICATIONS

The World Intellectual Property Organization (WIPO) International Search Report for PCT/CN2016/105370 Jan. 18, 2017 6 Pages (including translation).

*Primary Examiner* — Md S Elahee
(74) *Attorney, Agent, or Firm* — Anova Law Group, PLLC (57) ABSTRACT

The present disclosure discloses an echo cancellation method and apparatus. The method includes: obtaining a far-end signal and a near-end signal; detecting whether a speech signal exists in the near-end signal; processing the far-end signal according to a normalized least mean square adaptive filtering (NLMS) algorithm to obtain an estimated signal, and subtracting the estimated signal from the near-end signal to obtain a residual signal; after it is detected that the speech signal exists in the near-end signal, detecting whether the residual signal meets a preset output condition; and when it is detected that the residual signal does not meet the preset output condition, multiplying the residual signal by a first attenuation factor to obtain an output signal.

12 Claims, 6 Drawing Sheets

(52) U.S. Cl.
CPC .............. *G10L 2021/02082* (2013.01); *H04M 2201/40* (2013.01)

(58) Field of Classification Search
USPC .......................... 379/406.01, 406.07, 406.08
See application file for complete search history.

(56) References Cited

FOREIGN PATENT DOCUMENTS

| | | |
|---|---|---|
| CN | 103067628 A | 4/2013 |
| CN | 105791611 A | 7/2016 |

ECHO CANCELLATION METHOD AND APPARATUS, AND COMPUTER STORAGE MEDIUM

CROSS-REFERENCES TO RELATED APPLICATIONS

This application is a continuation application of PCT Patent Application No. PCT/CN2016/105370, filed on Nov. 10, 2016, which claims priority to Chinese Patent Application No. 2016100965047, filed on Feb. 22, 2016, both of which are incorporated by reference in entirety.

FIELD OF THE TECHNOLOGY

The present disclosure relates to the field of signal processing technologies and, in particular, to an echo cancellation method and apparatus, and a computer storage medium thereof.

BACKGROUND OF THE DISCLOSURE

During a call process, when a first electronic device plays a speech signal sent by a second electronic device, a microphone in the first electronic device collects the speech signal, and sends the speech signal to the second electronic device. Consequently, a user of the second electronic device hears an echo of the speech signal from the user, affecting call quality. Therefore, it is necessary to cancel the echo during the call process.

In related technologies, an echo cancellation method is provided. First, a first electronic device inputs a far-end signal and a near-end signal to a double-end detection module of the first electronic device. The far-end signal is a speech signal sent by a second electronic device, and the near-end signal is a mixed signal including an echo signal generated when the first electronic device plays the far-end signal and a speech signal from a user of the first electronic device. The double-end detection module detects whether a speech signal exists in the near-end signal, inputs a detection result and the far-end signal to a normalized least mean square adaptive filtering (NLMS) module, obtains an estimated signal of the far-end signal according to the far-end signal and outputs the estimated signal, and then subtracts the estimated signal from the near-end signal to obtain a residual signal. The residual signal is inputted to a non-linear processing (NLP) module to reduce the echo signal when the detection result received by the NLMS module is that the speech signal exists in the near-end signal, to improve an effect of echo cancellation. The residual signal is inputted to the NLMS module when the detection result received by the NLMS module is that no speech signal exists in the near-end signal, and the residual signal is used for estimation of the far-end signal for the next time.

Because there is certain error when the NLMS module estimates the far-end signal, a part of the echo signal remains in the residual signal obtained by subtracting the estimated signal from the near-end signal, affecting call quality.

SUMMARY

Embodiments of the present invention provide an echo cancellation method and apparatus, and computer storage medium thereof.

According to one aspect, an echo cancellation method is provided. The method includes: obtaining a far-end signal and a near-end signal; detecting whether a speech signal exists in the near-end signal; processing the far-end signal according to a normalized least mean square adaptive filtering (NLMS) algorithm to obtain an estimated signal, and subtracting the estimated signal from the near-end signal to obtain a residual signal; after it is detected that the speech signal exists in the near-end signal, detecting whether the residual signal meets a preset output condition; and when it is detected that the residual signal does not meet the preset output condition, multiplying the residual signal by a first attenuation factor to obtain an output signal.

According to another aspect, an echo cancellation electronic device is provided. The electronic device includes a memory storing instructions and a processor coupled to the memory. When executing the instructions, the processor is configured for: obtaining a far-end signal and a near-end signal; detecting whether a speech signal exists in the near-end signal; processing the far-end signal according to a normalized least mean square adaptive filtering (NLMS) algorithm to obtain an estimated signal, and subtracting the estimated signal from the near-end signal to obtain a residual signal; after it is detected that the speech signal exists in the near-end signal, detecting whether the residual signal meets a preset output condition; and when it is detected that the residual signal does not meet the preset output condition, multiplying the residual signal by a first attenuation factor to obtain an output signal.

According to another aspect, a non-transitory computer-readable storage medium is provided. The non-transitory computer-readable storage medium contains computer-executable instructions for, when executed by one or more processors, performing an echo cancellation method. The method includes: obtaining a far-end signal and a near-end signal; detecting whether a speech signal exists in the near-end signal; processing the far-end signal according to a normalized least mean square adaptive filtering (NLMS) algorithm to obtain an estimated signal, and subtracting the estimated signal from the near-end signal to obtain a residual signal; after it is detected that the speech signal exists in the near-end signal, detecting whether the residual signal meets a preset output condition; and when it is detected that the residual signal does not meet the preset output condition, multiplying the residual signal by a first attenuation factor to obtain an output signal.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show merely some embodiments of the present invention, and a person of ordinary skill in the technology may derive other drawings from these accompanying drawings without creative efforts.

DETAILED DESCRIPTION

The following describes exemplary embodiments in detail, and examples of the exemplary embodiments are shown in the accompanying drawings. When the descriptions below relate to the accompanying drawings, unless otherwise specified, a same number in different drawings may represent a same or similar element. The implementations described in the exemplary embodiments below do not represent all implementations consistent with the present disclosure. On the contrary, the implementations below are merely examples of the apparatus and the method that are consistent with some aspects of the present disclosure, and should not be used for limiting the present disclosure.

Figure 1:
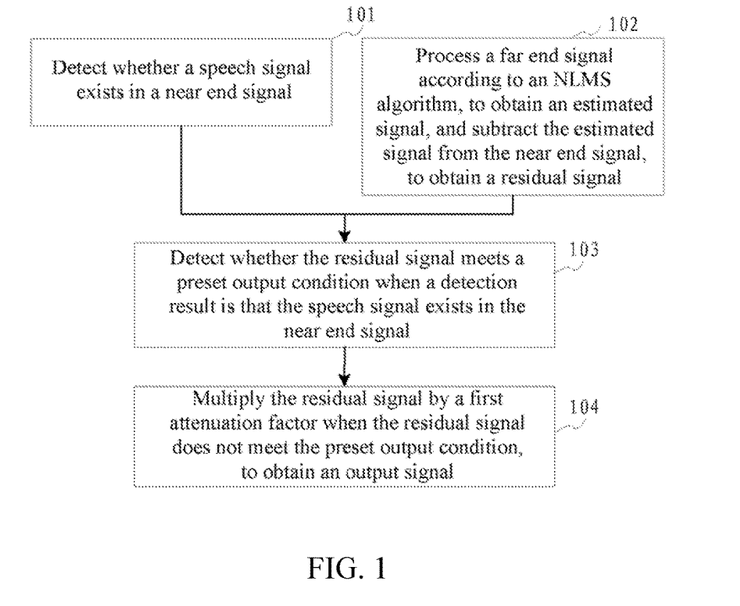
FIG. 1 is a schematic flowchart of an echo cancellation method according to an embodiment of the present invention.

Referring to FIG. 1, FIG. 1 is a flowchart of an echo cancellation method provided in an embodiment of the present invention. In this embodiment, the echo cancellation method may be applied to an electronic device, and the electronic device may be a device that can be used for voice conversation. The echo cancellation method may include but is not limited to the followings.

Step 101: Detecting whether a speech signal exists in a near-end signal.

Step 102: Processing a far-end signal according to an NLMS algorithm to obtain an estimated signal, and subtracting the estimated signal from the near-end signal to obtain a residual signal.

It should be noted that, Step 101 may be performed before Step 102, or may be performed after Step 102, or Step 101 and Step 102 may be simultaneously performed, without any specific limitation.

Step 103: When it is detected that the speech signal exists in the near-end signal, detecting whether the residual signal meets a preset output condition.

Step 104: When the residual signal does not meet the preset output condition, multiplying the residual signal by a first attenuation factor to obtain an output signal.

Thus, according to the echo cancellation method provided in this embodiment of the present invention, it is detected whether the residual signal meets the preset output condition, and the residual signal is multiplied by the first attenuation factor when the residual signal does not meet the preset output condition, so as to obtain the output signal, so that when it is detected that the residual signal still includes a relatively strong echo signal, the electronic device may output the residual signal after performing attenuation. This may resolve the problem that the residual signal obtained by subtracting the estimated signal from the near-end signal still includes the relatively strong echo signal to impact call quality because the estimated signal obtained by estimating the far-end signal by using the NLMS algorithm is inaccurate, thereby improving the call quality.

Figure 2A:
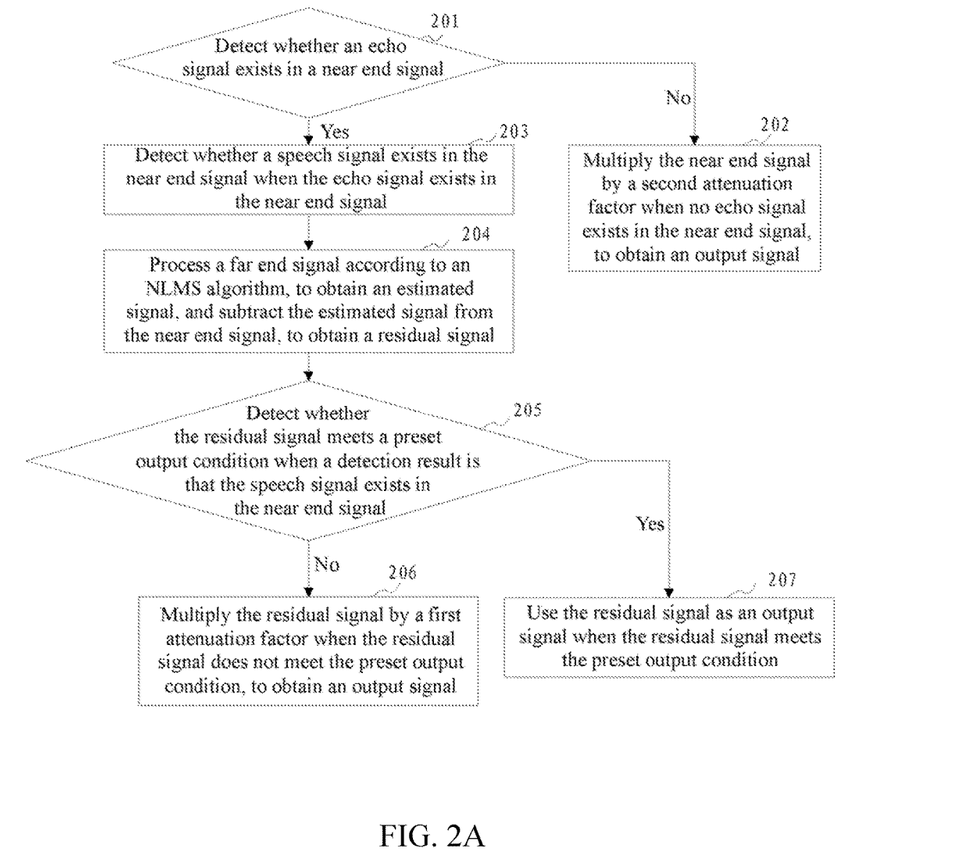
FIG. 2A is a schematic flowchart of another echo cancellation method according to an embodiment of the present invention.

Referring to FIG. 2A, FIG. 2A is a flowchart of an echo cancellation method provided in an embodiment of the present invention. In this embodiment, the echo cancellation method may be applied to an electronic device. The echo cancellation method may include but is not limited to the followings.

Step 201: Detecting whether an echo signal exists in a near-end signal.

In this embodiment, it is detected in advance whether the echo signal exists in the near-end signal, and echo cancellation is subsequently performed when the echo signal exists, so as to resolve the problem that processor resource is wasted when no echo signal exists in the near-end signal, as the electronic device still estimates the far-end signal according to the NLMS algorithm and complexity of the NLMS algorithm is quite high, thereby reducing processor resource consumption.

Figure 2B:
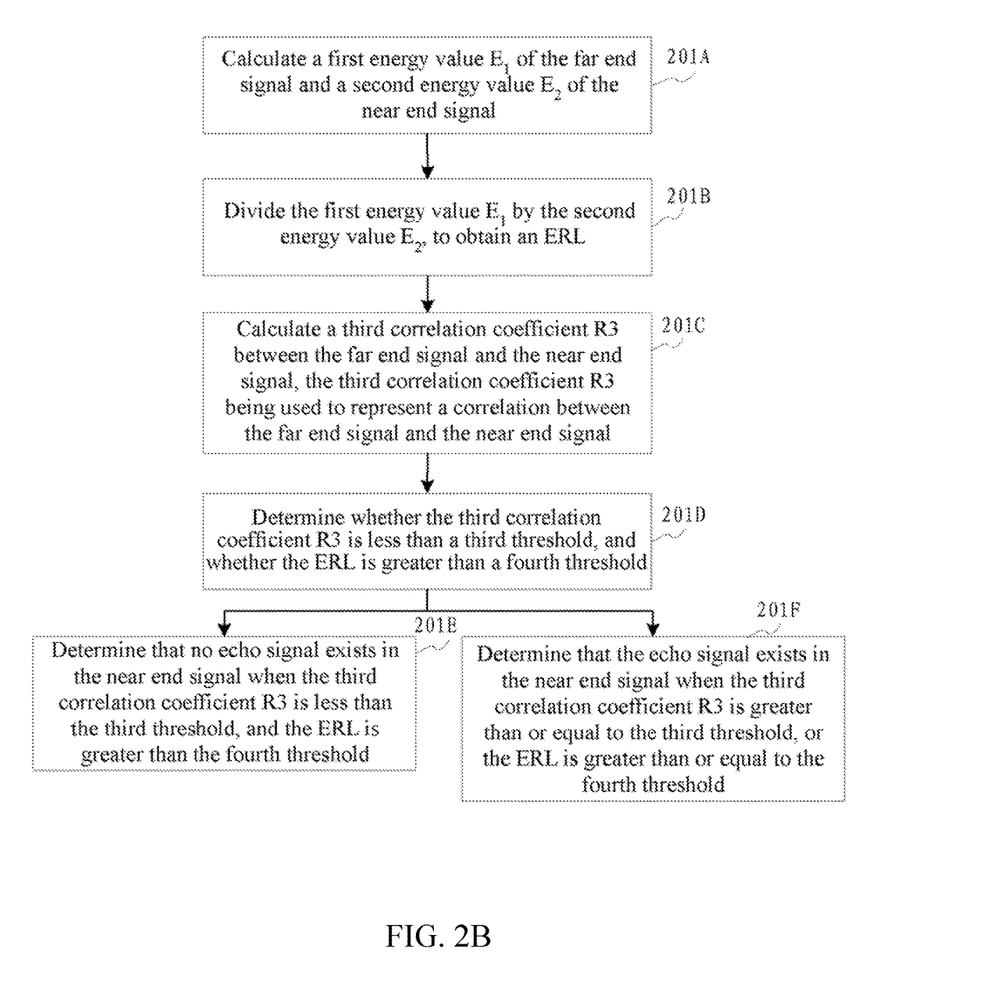
FIG. 2B is a schematic flowchart of still another method for detecting whether an echo signal exists in a near-end signal according to an embodiment of the present invention.

The far-end signal is a speech signal received by the electronic device from a remote counterpart device, and the echo signal is obtained by the electronic device by collecting the played speech signal. Therefore, the far-end signal approximates the echo signal. If the echo signal exists in the near-end signal, a correlation between the near-end signal and the far-end signal is quite high, and a matching degree between the near-end signal and the far-end signal is quite high. Therefore, in this embodiment, a method for detecting whether the echo signal exists in the near-end signal according to the correlation and the matching degree between the near-end signal and the far-end signal is provided. As shown in FIG. 2B, the detection method includes at least the followings.

Step 201A: Calculating a first energy value $E_1$ of the far-end signal and a second energy value $E_2$ of the near-end signal.

The electronic device separately calculates energy values of the far-end signal and the near-end signal according to the following energy value calculation formula.

$$E = \sum_{k=1}^{n} x^2(k)$$

where E represents an energy value, and x(k) represents a signal amplitude value of a signal with a length of n at the $k^{th}$ time point of n time points.

Step 201B: Dividing the first energy value $E_1$ by the second energy value $E_2$ to obtain an echo return loss (ERL).

Step 201C: Calculating a third correlation coefficient R3 between the far-end signal and the near-end signal, the third correlation coefficient R3 being used to represent a correlation between the far-end signal and the near-end signal.

The electronic device calculates the correlation coefficient between the far-end signal and the near-end signal according to the following correlation coefficient calculation formula.

$$R = \frac{\sum_{k=1}^{n} x(k) \times y(k)}{E_x \times E_y}$$

where R represents a correlation coefficient between signals x(k) and y(k); x(k) and y(k) each represents a signal amplitude value of a signal with a length of n at the $k^{th}$ time point of n time points; $E_x$ represents an energy value of the signal x(k); and $E_y$ represents an energy value of the signal y(k).

It should be noted that, Step 201A and Step 201B may be performed in any order or simultaneously.

Step 201D: Determining whether the third correlation coefficient R3 is less than a third threshold, and whether the ERL is greater than a fourth threshold.

In this embodiment, whether the echo signal exists in the near-end signal is determined according to two aspects, that is, the correlation degree and the matching degree, thereby improving determining accuracy.

During actual implementation, the third correlation coefficient R3 and the ERL may be inputted to a decision function. By means of the decision function, the third correlation coefficient R3 is compared with the third threshold, and the ERL is compared with the fourth threshold.

For example, the third correlation coefficient R3 and the ERL are inputted to a decision function fun(a,b;R3,ERL), where 'a' represents the third threshold and 'b' represents the fourth threshold.

The third threshold and the fourth threshold are preset in the electronic device. When the third correlation coefficient R3 is less than the third threshold, and the ERL is greater than the fourth threshold, Step 201E is performed; and when the third correlation coefficient R3 is greater than or equal to the third threshold, or the ERL is greater than or equal to the fourth threshold, Step 201F is performed.

It should be noted that, in this embodiment, it may only compare the correlation between the near-end signal and the far-end signal, or only compare the matching degree between the near-end signal and the far-end signal. This is not intended to be limiting.

Step 201E: Determining that no echo signal exists in the near-end signal when the third correlation coefficient R3 is less than the third threshold, and the ERL is greater than the fourth threshold, and the process completes afterwards.

If the third correlation coefficient R3 is less than the third threshold, it indicates that the near-end signal and the far-end signal do not correlate, and it further indicates that no echo signal exists in the near-end signal.

In addition, if the ERL is greater than the fourth threshold, it indicates that the near-end signal does not match the far-end signal, and it further indicates that no echo signal exists in the near-end signal.

Step 201F: Determining that the echo signal exists in the near-end signal when the third correlation coefficient R3 is greater than or equal to the third threshold, or the ERL is greater than or equal to the fourth threshold.

If the third correlation coefficient R3 is greater than or equal to the third threshold, it indicates that the near-end signal and the far-end signal correlate; and if the ERL is greater than or equal to the fourth threshold, it indicates that the near-end signal matches the far-end signal. In this case, the echo signal exists in the near-end signal.

According to the foregoing method for detecting whether the echo signal exists in the near-end signal, when it is detected that no echo signal exists in the near-end signal, Step 202 is performed; and when it is detected that the echo signal exists in the near-end signal, Step 203 is performed.

Step 202: Multiplying the near-end signal by a second attenuation factor when no echo signal exists in the near-end signal to obtain an output signal, and the process completes afterwards.

Because the detecting whether an echo signal exists in a near-end signal in Step 201 may be inaccurate, and when a quite small echo signal actually exists in the near-end signal, the detection result may be that no echo signal exists in the near-end signal. In this case, if the near-end signal is directly outputted, call quality is still affected. Therefore, the near-end signal can be multiplied by the second attenuation factor. Because the second attenuation factor is greater than 0 and less than 1, an amplitude value of the near-end signal can be reduced. Then, the electronic device uses the near-end signal multiplied by the second attenuation factor as an output signal.

Step 203: Detecting whether a speech signal exists in the near-end signal when the echo signal exists in the near-end signal.

A speech signal may not always exist in the near-end signal. For example, a user corresponding to the electronic device might not speak. When no speech signal exists in the near-end signal, to reduce transmission resource consumption, the electronic device does not need to output the near-end signal. In this case, the electronic device may first determine whether a speech signal exists in the near-end signal.

Step 204: Processing the far-end signal according to the NLMS algorithm, to obtain an estimated signal, and subtracting the estimated signal from the near-end signal, to obtain a residual signal.

The NLMS algorithm is an iteration algorithm. Assuming that the far-end signal is an array p(n) with a length of n, and the near-end signal is an array q(n) with a length of n, the estimated signal is an array r(n) with a length of n, and the residual signal is an array e(n) with a length of n, a specific formula of the NLMS algorithm is as follows:

$$r(n)=w(n) \cdot p(n)$$

$$e(n)=q(n)-r(n)$$

$$w(n+1)=w(n)+e(n \cdot x(n)$$

where, when n is equal to 0, w(n) is initialized as an array with n elements that are all 0 or with quite small elements, and w'(n) is a transpose of the array w(n).

In Step 203, when a detection result is that no speech signal exists in the near-end signal, the residual signal is used as the coefficient for the NLMS algorithm for the next time; and when the detection result is that the speech signal exists in the near-end signal, Step 205 is performed.

It should be noted that, the order for performing Step 203 and Step 204 is not limited in this embodiment.

Step 205: Detecting whether the residual signal meets a preset output condition when the detection result is that the speech signal exists in the near-end signal.

In this step, first, NLP processing may be performed on the obtained residual signal e(n). A formula of the NLP processing is as follows:

$$H(n) = \frac{P_r(n)}{P_r(n) + P_q(n)}$$

where $P_r(n)$ is a power spectrum of the estimated signal, $P_q(n)$ is a power spectrum of the near-end signal, and H(n) represents a transfer function.

The residual signal is multiplied by the foregoing transfer function H(n), so as to filter out the echo signal remaining in the residual signal, thereby reducing the echo signal. For ease of description, residual signals mentioned below are all signals obtained after NLP processing.

When the electronic device detects whether the speech signal exists in the near-end signal, certain error may exist. Therefore, if a quite small speech signal exists in the near-end signal actually, but the detection result of the electronic device is that no speech signal exists in the near-end signal, the residual signal is used as the coefficient for the NLMS algorithm for the next time. Consequently, an NLMS waveform is not convergent, the obtained estimated signal does not approximate the echo signal, and the echo signal cannot be completely canceled by subtracting the estimated signal from the near-end signal. Alternatively, if no speech signal exists in the near-end signal actually, but the detection result of the electronic device is that the speech signal exists in the near-end signal, the echo signal cannot be completely canceled because the electronic device cannot discover a change of the speech signal in time. In this embodiment, it is detected whether the residual signal meets an output condition. When the residual signal does not meet the output condition, echo reduction processing is performed, so as to better reduce the echo signal.

Figure 2C:
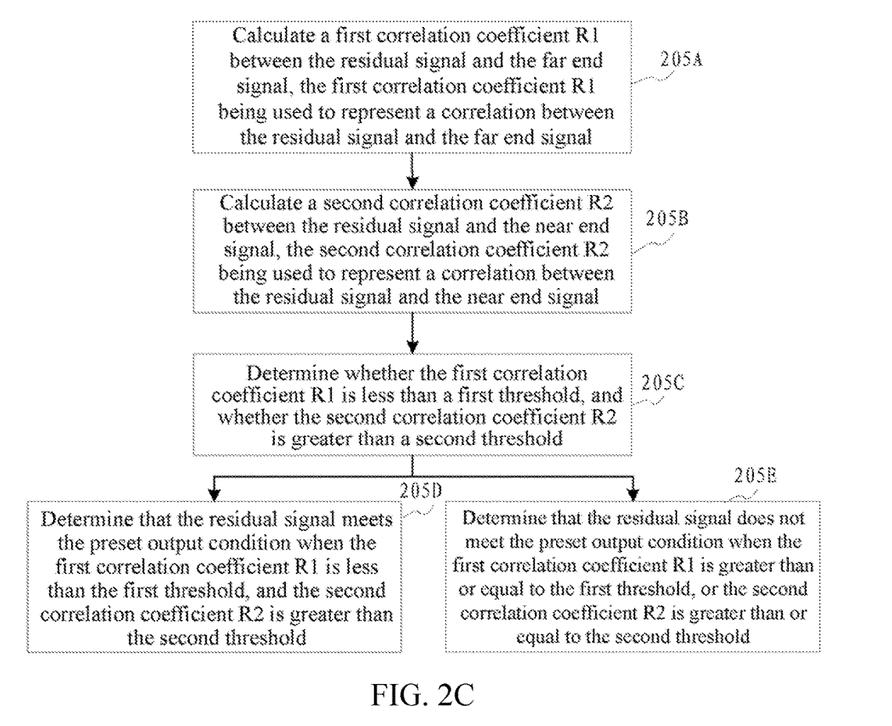
FIG. 2C is a flowchart of another method for detecting whether a residual signal meets a preset output condition according to an embodiment of the present invention.

If a relatively strong echo signal exists in the residual signal, a correlation between the residual signal and the far-end signal is quite high, and a correlation between the residual signal and the near-end signal is relatively low. Therefore, in this embodiment, a method for detecting whether the residual signal meets the output condition is provided according to the correlation between the residual signal and the far-end signal and the correlation between the residual signal and the near-end signal. As shown in FIG. 2C, the detection method includes the followings.

Step 205A: Calculating a first correlation coefficient R1 between the residual signal and the far-end signal, the first correlation coefficient R1 being used to represent a correlation between the residual signal and the far-end signal.

A value of the first correlation coefficient R1 may be calculated according to the correlation coefficient calculation formula in Step 201C.

Step 205B: Calculating a second correlation coefficient R2 between the residual signal and the near-end signal, the second correlation coefficient R2 being used to represent a correlation between the residual signal and the near-end signal.

A value of the second correlation coefficient R2 may be calculated according to the correlation coefficient calculation formula in Step 201C.

It should be noted that, Step 205A and Step 205B may be performed in any order or simultaneously.

Step 205C: Determining whether the first correlation coefficient R1 is less than a first threshold, and whether the second correlation coefficient R2 is greater than a second threshold.

In this embodiment, whether the residual signal meets the preset output condition is determined according to two aspects, that is, the correlation between the residual signal and the far-end signal, and the correlation between the residual signal and the near-end signal, thereby improving determining accuracy.

During actual implementation, values of the first correlation coefficient R1 and the second correlation coefficient R2 may be inputted to a decision function. By means of the decision function, the first correlation coefficient R1 is compared with the first threshold, and the second correlation coefficient R2 is compared with the second threshold.

For example, the first correlation coefficient R1 and the second correlation coefficient R2 are inputted to a decision function fun(c,d;R1,R2), where 'c' represents the first threshold and 'd' represents the second threshold.

The first threshold and the second threshold are preset in the electronic device. When the first correlation coefficient R1 is less than the first threshold, and the second correlation coefficient R2 is greater than the second threshold, Step 205D is performed; and when the first correlation coefficient R1 is greater than or equal to the first threshold, or the second correlation coefficient R2 is less than or equal to the second threshold, Step 205E is performed.

It should be noted that, in this embodiment, it may only compare the correlation between the residual signal and the far-end signal, or it may only compare the correlation between the residual signal and the near-end signal. This is not intended to be limiting.

Step 205D: Determining that the residual signal meets the preset output condition when the first correlation coefficient R1 is less than the first threshold, and the second correlation coefficient R2 is greater than the second threshold.

When the first correlation coefficient R1 is less than the first threshold, and the second correlation coefficient R2 is greater than the second threshold, it indicates that the residual signal includes a weak echo signal, and the residual signal may be outputted.

Step 205E: Determining that the residual signal does not meet the preset output condition when the first correlation coefficient R1 is greater than or equal to the first threshold, or the second correlation coefficient R2 is less than or equal to the second threshold.

When the first correlation coefficient R1 is greater than or equal to the first threshold, or the second correlation coefficient R2 is less than or equal to the second threshold, it indicates that the residual signal includes a strong echo signal, and the residual signal needs to be further processed.

When it is detected that the residual signal does not meet the preset output condition by using the foregoing method for detecting whether the residual signal meets the output condition, Step 206 is performed; and when it is detected that the residual signal meets the preset output condition by using the foregoing method, Step 207 is performed.

Step 206: Multiplying the residual signal by a first attenuation factor when the residual signal does not meet the preset output condition to obtain an output signal, and the process completes afterwards.

In this embodiment, the residual signal that does not meet the preset output condition is multiplied by the first attenuation factor. Because the first attenuation factor is greater than 0 and less than 1, an amplitude value of the residual signal can be reduced, thereby improving call quality.

Step 207: Using the residual signal as the output signal when the residual signal meets the preset output condition.

It should be noted that, in this embodiment, Step 201 to Step 204 may be implemented in the electronic device as an independent embodiment, and Step 203 to Step 206 may be implemented in the electronic device as another independent embodiment.

Thus, according to the echo cancellation method provided in this embodiment of the present invention, it is detected whether the residual signal meets the preset output condition, and the residual signal is multiplied by the first attenuation factor when the residual signal does not meet the preset output condition, to obtain the output signal. When it is detected that the residual signal still includes a relatively strong echo signal, the electronic device may output the residual signal after further performing attenuation, so as to resolve the problem that the residual signal obtained by subtracting the estimated signal from the near-end signal still includes the relatively strong echo signal to affect call quality because the estimated signal obtained by estimating the far-end signal by using the NLMS algorithm is inaccurate, thereby improving the call quality.

In addition, it is detected whether the echo signal exists in the near-end signal, and the near-end signal is multiplied by the second attenuation factor when no echo signal exists in the near-end signal, to obtain the output signal, so that the electronic device does not need to estimate the far-end signal according to the NLMS algorithm all along during a call process, so as to resolve the problem that processor resource is wasted when no echo signal exists in the near-end signal, as the electronic device still estimates the far-end signal according to the NLMS algorithm and complexity of the NLMS algorithm is quite high, thereby reducing processor resource consumption.

Figure 3:
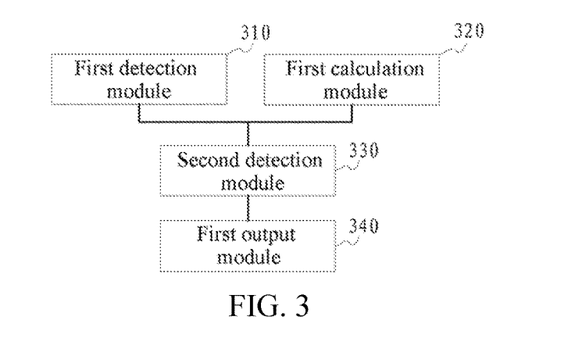
FIG. 3 is a schematic structural diagram of an echo cancellation apparatus according to an embodiment of the present invention.

Referring to FIG. 3, FIG. 3 is a block diagram of an echo cancellation apparatus provided in an embodiment of the present invention. In this embodiment, the echo cancellation apparatus may reside in an electronic device as an example for description. The echo cancellation apparatus may include but is not limited to the following modules: a first detection module 310, a first calculation module 320, a second detection module 330, and a first output module 340.

The first detection module 310 may be configured to detect whether a speech signal exists in a near-end signal. The first calculation module 320 may be configured to: process a far-end signal according to an NLMS adaptive filtering algorithm to obtain an estimated signal, and subtract the estimated signal from the near-end signal to obtain a residual signal.

The second detection module 330 may be configured to detect whether the residual signal obtained by the first calculation module 320 meets a preset output condition when a detection result of the first detection module 310 is that the speech signal exists in the near-end signal. The first output module 340 may be configured to multiply the residual signal by a first attenuation factor when a detection result of the second detection module 330 is that the residual signal does not meet the preset output condition, to obtain an output signal.

According to the echo cancellation apparatus provided in this embodiment of the present invention, it is detected whether the residual signal meets the preset output condition, and the residual signal is multiplied by the first attenuation factor when the residual signal does not meet the preset output condition, to obtain the output signal, so that when detecting that the residual signal still includes a relatively strong echo signal, the electronic device may output the residual signal after further performing attenuation, so as to resolve the problem that the residual signal obtained by subtracting the estimated signal from the near-end signal still includes the relatively strong echo signal to affect call quality because the estimated signal obtained by estimating the far-end signal by using the NLMS algorithm is inaccurate, thereby improving the call quality.

Figure 4:
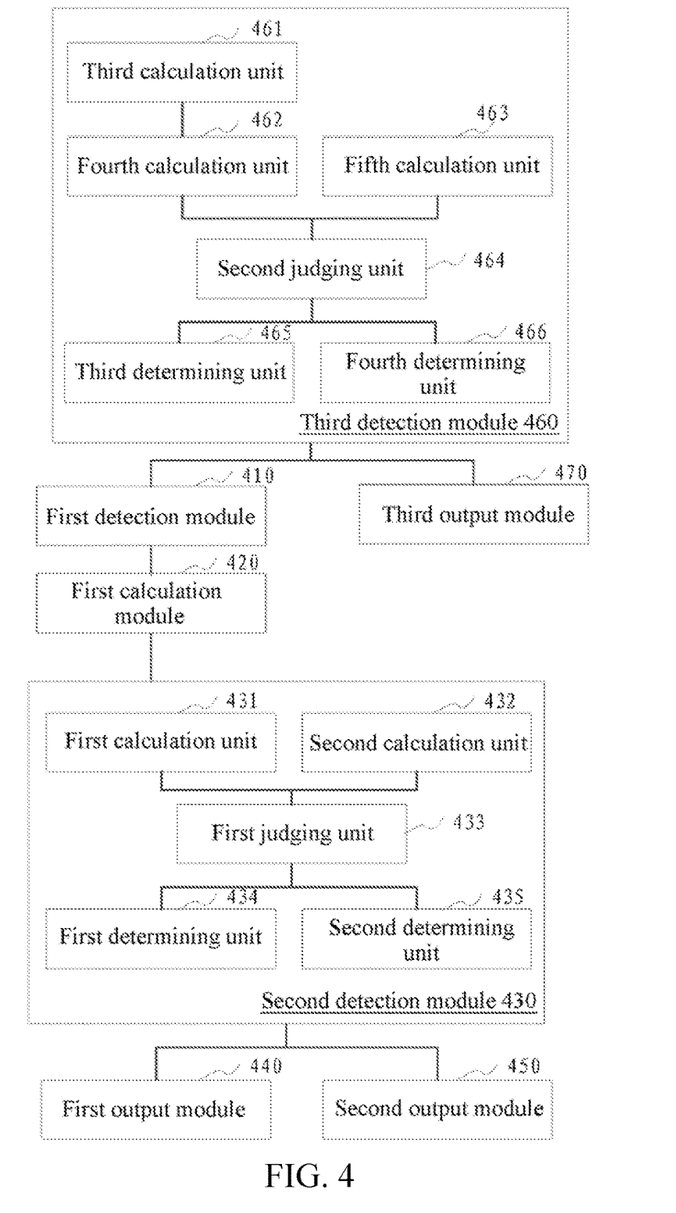
FIG. 4 is a schematic structural diagram of another echo cancellation apparatus according to an embodiment of the present invention.

Referring to FIG. 4, FIG. 4 is a block diagram of an echo cancellation apparatus provided in an embodiment of the present invention. In this embodiment, the echo cancellation apparatus may reside in an electronic device as an example for description. The echo cancellation apparatus may include but is not limited to the following modules: a first detection module 410, a first calculation module 420, a second detection module 430, and a first output module 440.

The first detection module 410 may be configured to detect whether a speech signal exists in a near-end signal. The first calculation module 420 may be configured to: process a far-end signal according to an NLMS adaptive filtering algorithm to obtain an estimated signal, and subtract the estimated signal from the near-end signal to obtain a residual signal;

The second detection module 430 may be configured to: detect whether the residual signal obtained by the first calculation module 420 meets a preset output condition when a detection result of the first detection module 410 is that the speech signal exists in the near-end signal. The first output module 440 may be configured to: multiply the residual signal by a first attenuation factor when a detection result of the second detection module 430 is that the residual signal does not meet the preset output condition, to obtain an output signal.

Optionally, the second detection module 430 includes: a first calculation unit 431, a second calculation unit 432, a first judging unit 433, a first determining unit 434, and a second determining unit 435.

The first calculation unit 431 may be configured to calculate a first correlation coefficient R1 between the residual signal and the far-end signal, the first correlation coefficient R1 being used to represent a correlation between the residual signal and the far-end signal.

The second calculation unit 432 may be configured to calculate a second correlation coefficient R2 between the residual signal and the near-end signal, the second correlation coefficient R2 being used to represent a correlation between the residual signal and the near-end signal.

The first judging unit 433 may be configured to determine whether the first correlation coefficient R1 calculated by the first calculation unit 431 is less than a first threshold, and whether the second correlation coefficient R2 calculated by the second calculation unit 432 is greater than a second threshold.

The first determining unit 434 may be configured to determine that the residual signal meets the preset output condition when a determining result of the first judging unit 433 is that the first correlation coefficient R1 is less than the first threshold, and the second correlation coefficient R2 is greater than the second threshold.

The second determining unit 435 may be configured to determine that the residual signal does not meet the preset output condition when the determining result of the first judging unit 433 is that the first correlation coefficient R1 is greater than or equal to the first threshold, or the second correlation coefficient R2 is less than or equal to the second threshold.

Optionally, the apparatus further includes a second output module 450, which may be configured to use the residual signal as an output signal when the detection result of the second detection module 430 is that the residual signal meets the preset output condition.

Optionally, the apparatus further includes a third detection module 460 and a third output module 470. The third detection module 460 may be configured to detect whether an echo signal exists in the near-end signal, where the first detection module 410 is further configured to perform the step of detecting whether a speech signal exists in the near-end signal when a detection result of the third detection module 460 is that the echo signal exists in the near-end signal; and the third output module 470 may be configured to multiply the near-end signal by a second attenuation factor when the detection result of the third detection module 460 is that no echo signal exists in the near-end signal, to obtain an output signal.

Optionally, the third detection module 460 includes: a third calculation unit 461, a fourth calculation unit 462, a fifth calculation unit 463, a second judging unit 464, a third determining unit 465, and a fourth determining unit 466.

The third calculation unit 461 may be configured to calculate a first energy value E1 of the far-end signal and a second energy value E2 of the near-end signal. The fourth calculation unit 462 may be configured to divide the first energy value E1 calculated by the third calculation unit 461 by the second energy value E2, to obtain an echo return loss (ERL).

The fifth calculation unit 463 may be configured to calculate a third correlation coefficient R3 between the far-end signal and the near-end signal, the third correlation coefficient R3 being used to represent a correlation between the far-end signal and the near-end signal.

The second judging unit 464 may be configured to determine whether the third correlation coefficient R3 calculated by the fifth calculation unit 463 is less than a third threshold, and whether the ERL calculated by the fourth calculation unit 462 is greater than a fourth threshold.

The third determining unit 465 may be configured to determine that no echo signal exists in the near-end signal when a determining result of the second judging unit 464 is that the third correlation coefficient R3 is less than the third threshold, and the ERL is greater than the fourth threshold.

The fourth determining unit 466 may be configured to determine that the echo signal exists in the near-end signal when the determining result of the second judging unit 464 is that the third correlation coefficient R3 is greater than or equal to the third threshold, or the ERL is greater than or equal to the fourth threshold.

According to the echo cancellation apparatus provided in this embodiment of the present invention, it is detected whether the residual signal meets the preset output condition, and the residual signal is multiplied by the first attenuation factor when the residual signal does not meet the preset output condition, to obtain the output signal, so that when detecting that the residual signal still includes a relatively strong echo signal, the electronic device may output the residual signal after further performing attenuation, so as to resolve the problem that the residual signal obtained by subtracting the estimated signal from the near-end signal still includes the relatively strong echo signal to affect call quality because the estimated signal obtained by estimating the far-end signal by using the NLMS algorithm is inaccurate, thereby improving the call quality.

In addition, it is detected whether the echo signal exists in the near-end signal, and the near-end signal is multiplied by the second attenuation factor when no echo signal exists in the near-end signal, to obtain the output signal, so that the electronic device does not need to estimate the far-end signal according to the NLMS algorithm all along during a call process, so as to resolve the problem that processor resource is wasted when no echo signal exists in the near-end signal, as the electronic device still estimates the far-end signal according to the NLMS algorithm and complexity of the NLMS algorithm is quite high, thereby reducing processor resource consumption.

It should be noted that division of the foregoing functional modules is only described for illustrative purposes when the echo cancellation apparatus provided in the foregoing embodiments cancels an echo. In an actual application, the foregoing functions may be allocated to be accomplished by different functional modules according to requirements, that is, the internal structure of the apparatus is divided into different functional modules, to accomplish all or some functions of the above described functions. In addition, an inventive concept of the echo cancellation apparatus provided in the foregoing embodiments is the same as that of the echo cancellation method embodiments. For a specific implementation process, refer to the method embodiments for details, and details are not described herein again.

Figure 5:
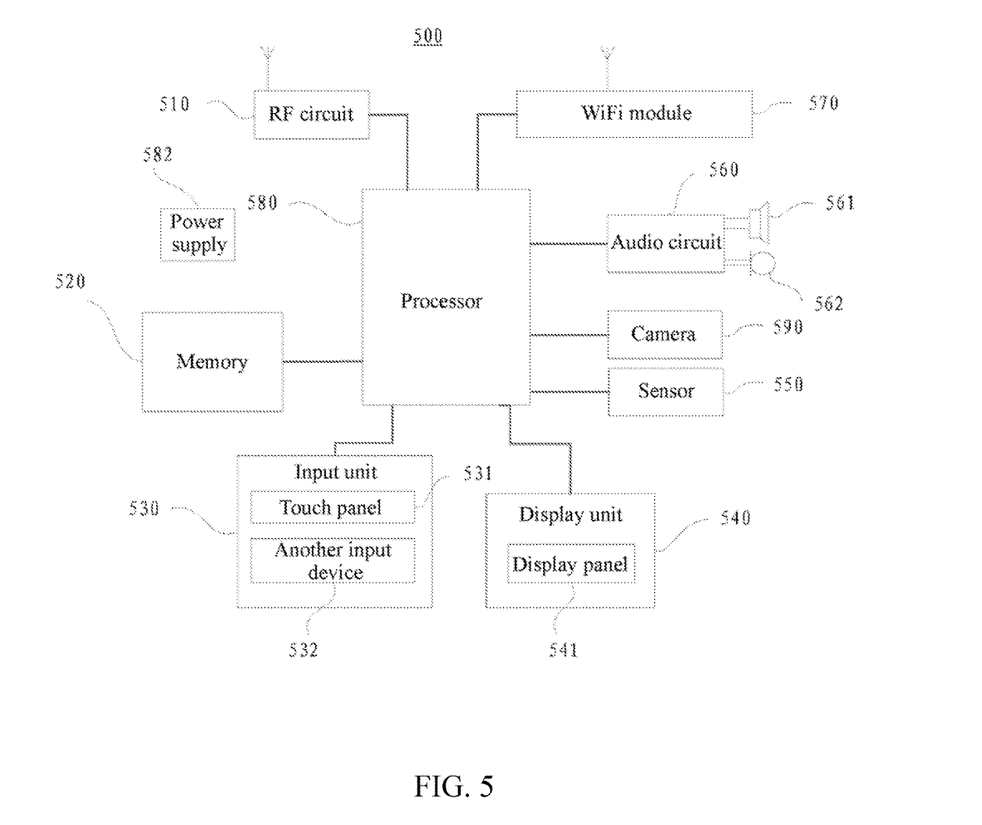
FIG. 5 is a schematic structural diagram of a terminal including the echo cancellation apparatus according to an embodiment of the present invention.

FIG. 5 is a schematic structural diagram of a communication terminal (i.e., the electronic device) including the echo cancellation apparatus according to any one of the foregoing technical solutions. The terminal 500 in this embodiment of the present invention may include one or more components as follows: a processor configured to execute a computer program instruction to complete various processes and methods, a random access memory (RAM) and a read only memory (ROM) that are configured to store information and a program instruction, a memory configured to store data and information, an I/O device, an interface, an antenna, or the like.

More specifically, the terminal 500 may include components such as a radio frequency (RF) circuit 510, a memory 520, an input unit 530, a display unit 540, a sensor 550, an audio circuit 560, a wireless fidelity (WiFi) module 570, a processor 580, a power supply 582, and a camera 590. A person skilled in the technology may understand that the structure of the terminal shown in FIG. 5 does not constitute a limitation to the terminal, and the terminal may include more or fewer components than those shown in the figure, or some components may be combined, or a different component deployment may be used.

The RF circuit 510 may be configured to receive and send a signal during an information receiving and sending process or a call process. Specifically, the RF circuit receives downlink information from a base station, then delivers the downlink information to the processor 580 for processing, and sends related uplink data to the base station. Generally, the RF circuit includes, but is not limited to an antenna, at least one amplifier, a transceiver, a coupler, a low noise amplifier (LNA), a duplexer, and the like. In addition, the RF circuit 510 may also communicate with a network and another device by means of wireless communication. The wireless communication may use any communications standard or protocol, including but not limited to: Global System for Mobile Communications (GSM), General Packet Radio Service (GPRS), Code Division Multiple Access (CDMA), Wideband Code Division Multiple Access (WCDMA), Long Term Evolution (LTE), an e-mail, a short messaging service (SMS), and the like.

The memory 520 may be configured to store a software program and a module, and the processor 580 runs the software program and the module that are stored in the memory 520, so as to perform various function applications of the terminal 500 and data processing. The memory 520 may mainly include a program storage area and a data storage area. The program storage area may store an operating system, an application program required by at least one function (such as a sound playback function and an image display function), and the like. The data storage area may store data (such as audio data and an address book) created according to use of the terminal 500, and the like. In addition, the memory 520 may include a high speed random access memory, and may also include a non-volatile memory such as at least one magnetic disk storage device, a flash memory, or another volatile solid-state storage device.

The input unit 530 may be configured to receive input digit or character information, and generate a key signal input related to the user setting and function control of the terminal 500. Specifically, the input unit 530 may include a touch panel 531 and another input device 532. The touch panel 531 may also be referred to as a touchscreen, and may collect a touch operation of a user on or near the touch panel (such as an operation of a user on or near the touch panel 531 by using any suitable object or attachment, such as a finger or a touch pen), and drive a corresponding connection apparatus according to a preset program. Optionally, the touch panel 531 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinate to the processor 580. Moreover, the touch controller can receive and execute a command sent from the processor 580. In addition, the touch panel 531 may be of a resistive, capacitive, infrared, or surface acoustic wave type. In addition to the touch panel 531, the input unit 530 may further include another input device 532. Specifically, another input device 532 may include, but is not limited to, one or more of a physical keyboard, a functional key (such as a volume control key or a switch key), a track ball, a mouse, and a joystick.

The display unit 540 may be configured to display information entered by the user or information provided for the user, and various menus of the terminal 500. The display unit 540 may include a display panel 541. Optionally, the display panel 541 may be configured by using a liquid crystal display (LCD), an organic light-emitting diode (OLED), or the like. Further, the touch panel 531 may cover the display panel 541. After detecting a touch operation on or near the touch panel 531, the touch panel 531 transfers the touch operation to the processor 580, so as to determine a type of a touch event. Then, the processor 580 provides corresponding visual output on the display panel 541 according to the type of the touch event. Although, in FIG. 5, the touch panel 531 and the display panel 541 are used as two separate parts to implement input and output functions of the terminal 500, in some embodiments, the touch panel 531 and the display panel 541 may be integrated to implement the input and output functions of the terminal 500.

The terminal 500 may further include at least one sensor 550, such as a gyroscope sensor, a magnetic induction sensor, an optical sensor, a motion sensor, and another sensor. Specifically, the optical sensor may include an ambient light sensor and a proximity sensor. The ambient light sensor may adjust luminance of the display panel 541 according to brightness of the ambient light. The proximity sensor may switch off the display panel 541 and/or backlight when the terminal 500 is moved to the ear. As one type of motion sensor, an acceleration sensor may detect magnitude of accelerations in various directions (generally on three axes), may detect magnitude and a direction of the gravity when static, and may be applied to an application that recognizes the attitude of the terminal (for example, switching between landscape orientation and portrait orientation, a related game, and magnetometer attitude calibration), a function related to vibration recognition (such as a pedometer and a knock), and the like. Other sensors such as a barometer, a hygrometer, a thermometer, and an infrared sensor, which may be configured in the terminal 500, are not further described herein.

The audio circuit 560, a speaker 581, and a microphone 562 may provide audio interfaces between the user and the terminal 500. The audio circuit 560 may convert received audio data into an electric signal and transmit the electric signal to the speaker 561. The speaker 561 converts the electric signal into a sound signal for output. On the other hand, the microphone 562 converts a collected sound signal into an electric signal. The audio circuit 560 receives the electric signal and converts the electric signal into audio data, and outputs the audio data to the processor 580 for processing. Then, the processor 580 sends the audio data to, for example, another terminal by using the RF circuit 510, or outputs the audio data to the memory 520 for further processing.

The WiFi is based on a short distance wireless transmission technology. The terminal 500 may help, by using the WiFi module 570, the user to receive and send e-mails, browse a web page, access streaming media, and so on, which provides wireless broadband Internet access for the user. Although FIG. 5 shows the WiFi circuit 570, it may be understood that the WiFi circuit 570 is not a necessary component of the terminal 500, and when required, the WiFi circuit 570 may be omitted as long as the scope of the essence of the present disclosure is not changed.

The processor 580 is the control center of the terminal 500, and is connected to various parts of the entire terminal by using various interfaces and wires. By running or executing the software program and/or module stored in the memory 520, and invoking data stored in the memory 520, the processor 580 performs various functions and data processing of the terminal 500, thereby performing overall monitoring on the terminal. Optionally, the processor 580 may include one or more processing units. Preferably, the processor 580 may integrate an application processor and a modem processor. The application processor mainly processes an operating system, a user interface, an application program, and the like. The modem processor mainly processes wireless communication. It may be understood that the foregoing modem processor may be not integrated into the processor 580.

The terminal 500 further includes the power supply 582 (such as a battery) for supplying power to the components. Preferably, the power supply may be logically connected to the processor 580 by using a power management system, thereby implementing functions such as charging, discharging, and power consumption management by using the power management system.

The camera 590 is generally formed by a lens, an image sensor, an interface, a digital signal processor, a CPU, a display screen, and the like. Then lens is fixed above the image sensor, and a focus may be changed by manually adjusting the lens. The image sensor is equivalent to a "film" of a conventional camera, and is a core for the camera to collect an image. The interface is configured to connect the camera to a mainboard of the terminal by using a flat cable, a board-to-board connector, and a spring, to send the collected image to the memory 520. The digital signal processor processes the collected image by means of mathematical operations, to convert the collected analog image into a digital image and send the digital image to the memory 520 by means of the interface.

Although not shown in the figure, the terminal 500 may further include a Bluetooth module and the like, which are not further described herein.

A person of ordinary skill in the technology may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

For example, an embodiment of the present invention further provides a computer storage medium. Computer executable instructions are stored in the computer storage medium, and the computer executable instructions are used to perform one or more of the foregoing echo cancellation methods, for example, one or more of the methods shown in FIG. 1, FIG. 2A, FIG. 2B, and FIG. 2C. The computer storage medium may be a random access storage medium RAM, a read-only storage medium ROM, or a flash memory, or may optionally be a non-transitory storage medium.

In another embodiment, the echo cancellation apparatus may include a processor and a storage medium. The processor and the storage medium are connected by means of a communications interface such as an internal bus. The processor may perform the operations of the foregoing one or more echo cancellation methods by reading code stored in the storage medium.

The foregoing embodiments are merely preferred embodiments of the present invention, and are not for limiting the present disclosure. It should be understood that any modification made within the spirit and specifications of the present disclosure and according to the principle of the present disclosure shall fall within the protection scope of the present disclosure.

What is claimed is:

1. An echo cancellation method, comprising:
obtaining a far-end signal and a near-end signal;
detecting whether a speech signal exists in the near-end signal;
processing the far-end signal according to a normalized least mean square adaptive filtering (NLMS) algorithm to obtain an estimated signal, and subtracting the estimated signal from the near-end signal to obtain a residual signal;
after it is detected that the speech signal exists in the near-end signal, detecting whether the residual signal meets a preset output condition; and
when it is detected that the residual signal does not meet the preset output condition, multiplying the residual signal by a first attenuation factor to obtain an output signal,
wherein the detecting whether the residual signal meets a preset output condition comprises:
calculating a first correlation coefficient R1 between the residual signal and the far-end signal, the first correlation coefficient R1 being used to represent a correlation between the residual signal and the far-end signal;
calculating a second correlation coefficient R2 between the residual signal and the near-end signal, the second correlation coefficient R2 being used to represent a correlation between the residual signal and the near-end signal;
determining whether the first correlation coefficient R1 is less than a first threshold, and whether the second correlation coefficient R2 is greater than a second threshold;
determining that the residual signal meets the preset output condition when the first correlation coefficient R1 is less than the first threshold, and the second correlation coefficient R2 is greater than the second threshold; and
determining that the residual signal does not meet the preset output condition when the first correlation coefficient R1 is greater than or equal to the first threshold, or the second correlation coefficient R2 is less than or equal to the second threshold.

2. The method according to claim 1, further comprising: using the residual signal as the output signal when the residual signal meets the preset output condition.

3. The method according to claim 1, wherein the detecting whether a speech signal exists in a near-end signal further comprises:
detecting whether an echo signal exists in the near-end signal;
when it is detected that the echo signal exists in the near-end signal, detecting whether a speech signal exists in the near-end signal; and
when it is detected that no echo signal exists in the near-end signal, multiplying the near-end signal by a second attenuation factor to obtain the output signal.

4. The method according to claim 3, wherein the detecting whether an echo signal exists in the near-end signal comprises:
calculating a first energy value $E_1$ of the far-end signal and a second energy value $E_2$ of the near-end signal;
dividing the first energy value $E_1$ by the second energy value $E_2$, to obtain an echo return loss (ERL); and
calculating a third correlation coefficient R3 between the far-end signal and the near-end signal, the third correlation coefficient R3 being used to represent a correlation between the far-end signal and the near-end signal;
determining whether the third correlation coefficient R3 is less than a third threshold, and whether the ERL is greater than a fourth threshold;
determining that no echo signal exists in the near-end signal when the third correlation coefficient R3 is less than the third threshold, and the ERL is greater than the fourth threshold; and
determining that the echo signal exists in the near-end signal when the third correlation coefficient R3 is greater than or equal to the third threshold, or the ERL is greater than or equal to the fourth threshold.

5. An electronic device for echo cancellation, comprising:
a memory storing instructions; and
a processor coupled to the memory and, when executing the instructions, configured for:
obtaining a far-end signal and a near-end signal;
detecting whether a speech signal exists in the near-end signal;
processing the far-end signal according to a normalized least mean square adaptive filtering (NLMS) algorithm to obtain an estimated signal, and subtracting the estimated signal from the near-end signal to obtain a residual signal;
after it is detected that the speech signal exists in the near-end signal, detecting whether the residual signal meets a preset output condition; and
when it is detected that the residual signal does not meet the preset output condition, multiplying the residual signal by a first attenuation factor to obtain an output signal,
wherein, for detecting whether the residual signal meets a preset output condition, the processor is further configured for:
calculating a first correlation coefficient R1 between the residual signal and the far-end signal, the first correlation coefficient R1 being used to represent a correlation between the residual signal and the far-end signal;
calculating a second correlation coefficient R2 between the residual signal and the near-end signal, the second correlation coefficient R2 being used to represent a correlation between the residual signal and the near-end signal;
determining whether the first correlation coefficient R1 is less than a first threshold, and whether the second correlation coefficient R2 is greater than a second threshold;
determining that the residual signal meets the preset output condition when the first correlation coefficient R1 is less than the first threshold, and the second correlation coefficient R2 is greater than the second threshold; and determining that the residual signal does not meet the preset output condition when the first correlation coefficient R1 is greater than or equal to the first threshold, or the second correlation coefficient R2 is less than or equal to the second threshold.

6. The electronic device according to claim 5, wherein the processor is further configured for:

using the residual signal as the output signal when the residual signal meets the preset output condition.

7. The electronic device according to claim 5, wherein, for detecting whether a speech signal exists in a near-end signal, the processor is further configured for:

detecting whether an echo signal exists in the near-end signal;

when it is detected that the echo signal exists in the near-end signal, detecting whether a speech signal exists in the near-end signal; and when it is detected that no echo signal exists in the near-end signal, multiplying the near-end signal by a second attenuation factor to obtain the output signal.

8. The electronic device according to claim 7, wherein, for detecting whether an echo signal exists in the near-end signal, the processor is further configured for:

calculating a first energy value $E_1$ of the far-end signal and a second energy value $E_2$ of the near-end signal;

dividing the first energy value $E_1$ by the second energy value $E_2$, to obtain an echo return loss (ERL); and calculating a third correlation coefficient R3 between the far-end signal and the near-end signal, the third correlation coefficient R3 being used to represent a correlation between the far-end signal and the near-end signal;

determining whether the third correlation coefficient R3 is less than a third threshold, and whether the ERL is greater than a fourth threshold;

determining that no echo signal exists in the near-end signal when the third correlation coefficient R3 is less than the third threshold, and the ERL is greater than the fourth threshold; and determining that the echo signal exists in the near-end signal when the third correlation coefficient R3 is greater than or equal to the third threshold, or the ERL is greater than or equal to the fourth threshold.

9. A non-transitory computer-readable storage medium containing computer-executable instructions for, when executed by one or more processors, performing an echo cancellation method, the method comprising:

obtaining a far-end signal and a near-end signal;

detecting whether a speech signal exists in the near-end signal;

processing the far-end signal according to a normalized least mean square adaptive filtering (NLMS) algorithm to obtain an estimated signal, and subtracting the estimated signal from the near-end signal to obtain a residual signal;

after it is detected that the speech signal exists in the near-end signal, detecting whether the residual signal meets a preset output condition; and when it is detected that the residual signal does not meet the preset output condition, multiplying the residual signal by a first attenuation factor to obtain an output signal, wherein the detecting whether the residual signal meets a preset output condition comprises:

calculating a first correlation coefficient R1 between the residual signal and the far-end signal, the first correlation coefficient R1 being used to represent a correlation between the residual signal and the far-end signal;

calculating a second correlation coefficient R2 between the residual signal and the near-end signal, the second correlation coefficient R2 being used to represent a correlation between the residual signal and the near-end signal;

determining whether the first correlation coefficient R1 is less than a first threshold, and whether the second correlation coefficient R2 is greater than a second threshold;

determining that the residual signal meets the preset output condition when the first correlation coefficient R1 is less than the first threshold, and the second correlation coefficient R2 is greater than the second threshold; and determining that the residual signal does not meet the preset output condition when the first correlation coefficient R1 is greater than or equal to the first threshold, or the second correlation coefficient R2 is less than or equal to the second threshold.

10. The non-transitory computer-readable storage medium according to claim 9, the method further comprising:

using the residual signal as the output signal when the residual signal meets the preset output condition.

11. The non-transitory computer-readable storage medium according to claim 9, wherein the detecting whether a speech signal exists in a near-end signal further comprises:

detecting whether an echo signal exists in the near-end signal;

when it is detected that the echo signal exists in the near-end signal, detecting whether a speech signal exists in the near-end signal; and when it is detected that no echo signal exists in the near-end signal, multiplying the near-end signal by a second attenuation factor to obtain the output signal.

12. The non-transitory computer-readable storage medium according to claim 11, wherein the detecting whether an echo signal exists in the near-end signal comprises:

calculating a first energy value $E_1$ of the far-end signal and a second energy value $E_2$ of the near-end signal;

dividing the first energy value $E_1$ by the second energy value $E_2$, to obtain an echo return loss (ERL); and calculating a third correlation coefficient R3 between the far-end signal and the near-end signal, the third correlation coefficient R3 being used to represent a correlation between the far-end signal and the near-end signal;

determining whether the third correlation coefficient R3 is less than a third threshold, and whether the ERL is greater than a fourth threshold;

determining that no echo signal exists in the near-end signal when the third correlation coefficient R3 is less than the third threshold, and the ERL is greater than the fourth threshold; and determining that the echo signal exists in the near-end signal when the third correlation coefficient R3 is greater than or equal to the third threshold, or the ERL is greater than or equal to the fourth threshold.

* * * * *